United States Patent Office 2,788,859
Patented Apr. 16, 1957

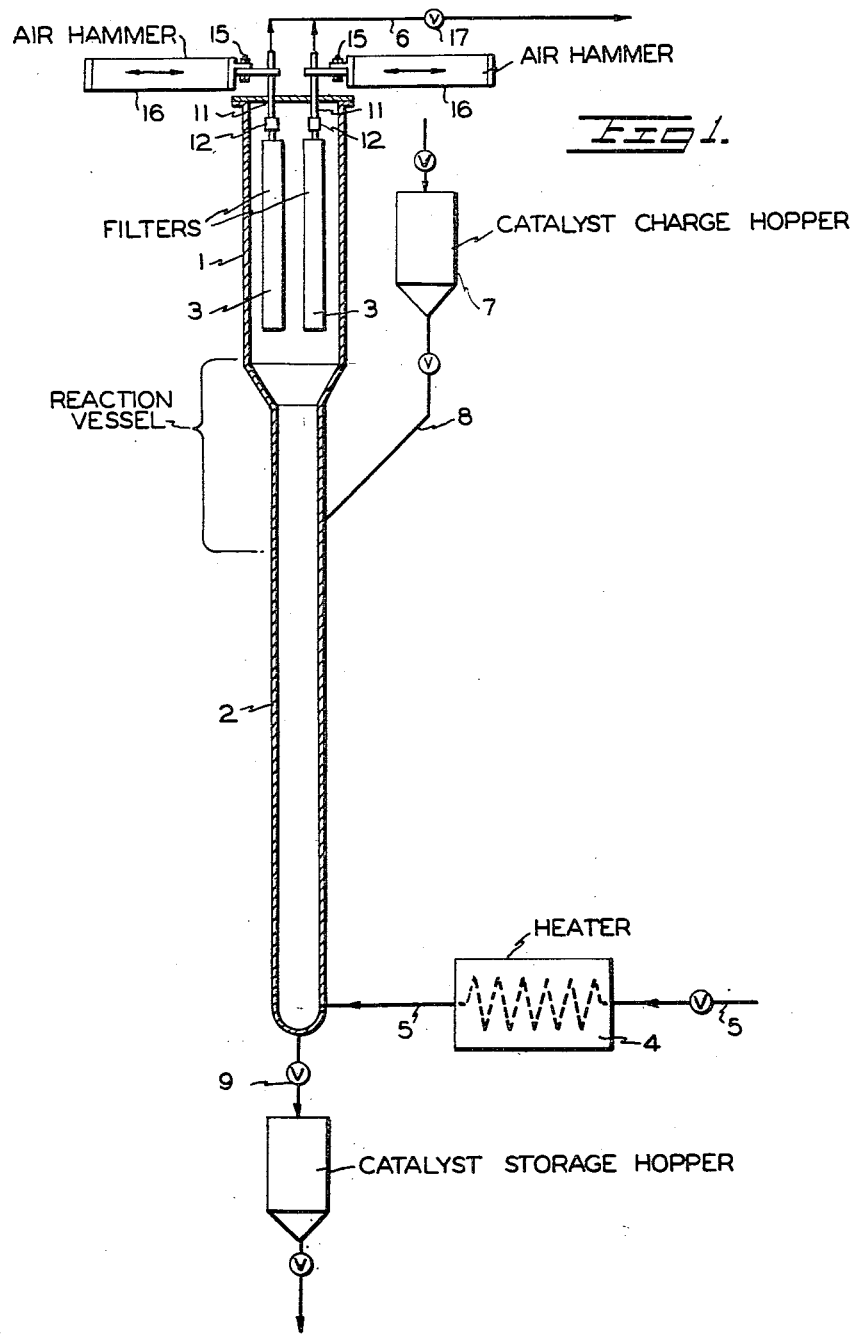

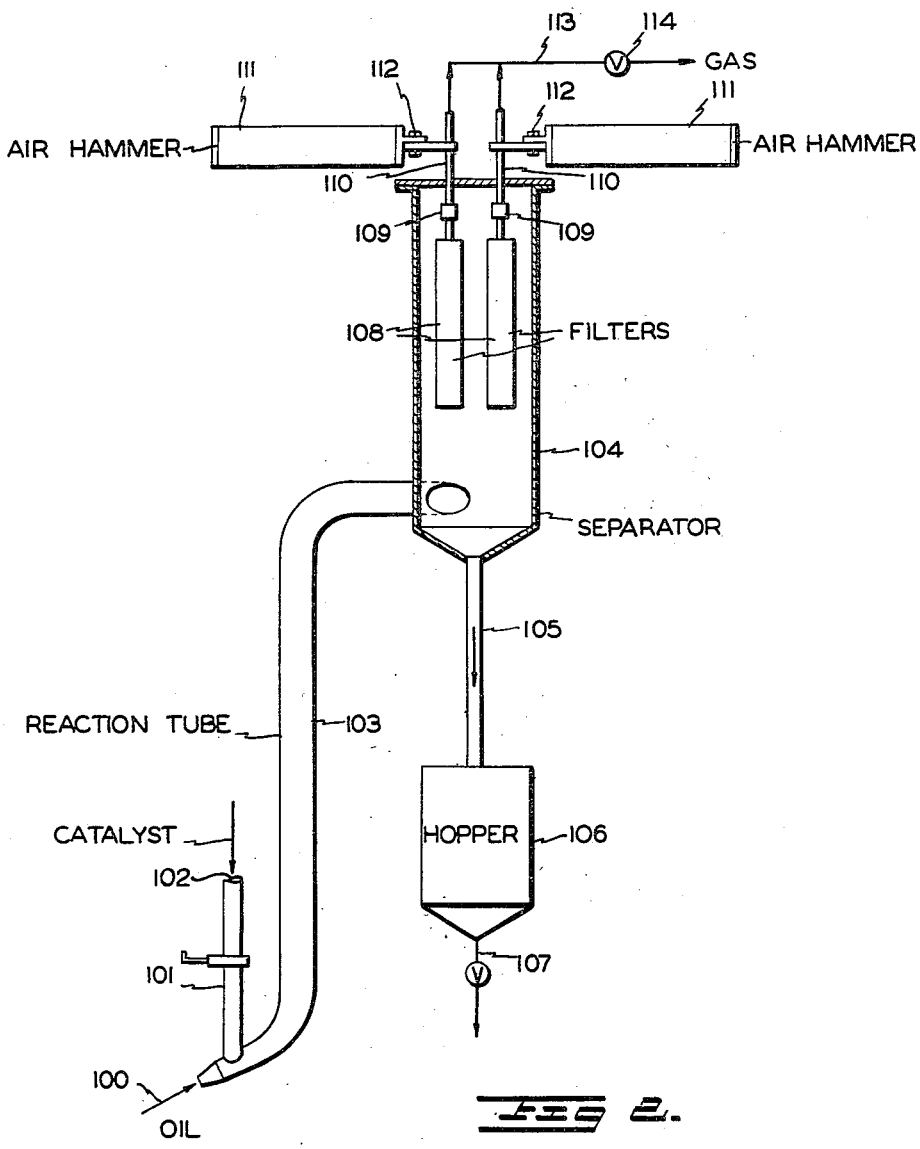

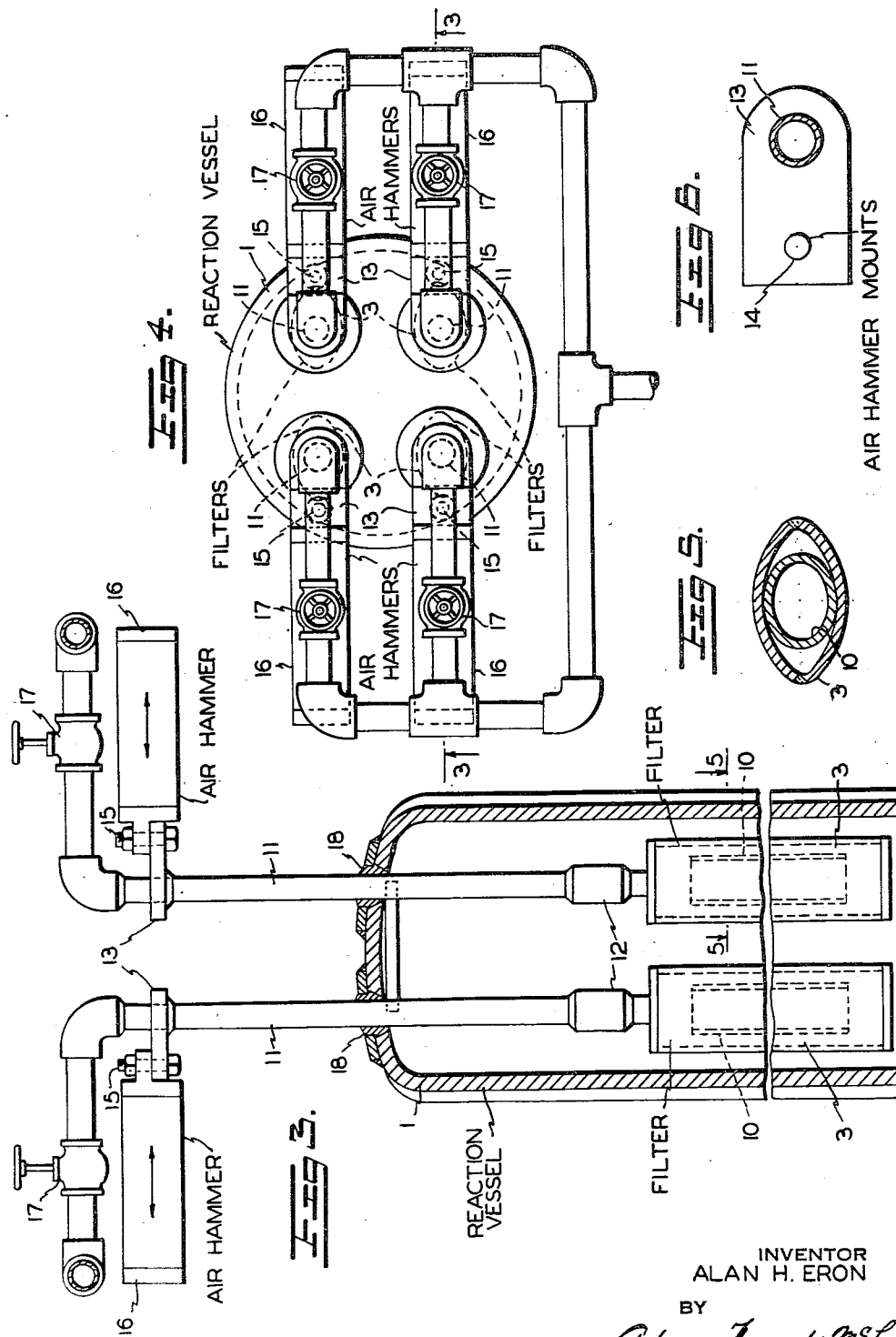

2,788,859

APPARATUS FOR SEPARATING SOLID PARTICLES FROM GASES

Alan H. Eron, Lansing, Ill., assignor to Sinclair Refining Company, New York, N. Y., a corporation of Maine Application March 22, 1954, Serial No. 417,859

1 Claim. (Cl. 183—41)

My invention relates to apparatus for the separation of finely divided solid particles from gases with the aid of a filter.

The art is aware of various operations in which the step of separating finely divided solid particles from gases must be practiced. Among such operations are the catalytic conversion of gas oil by passing it in vapor phase at an elevated temperature through a dense-phase fluidized bed of finely divided silica-alumina catalyst to produce gasoline and other conversion products. The problem of separating finely divided solid particles from gases is of particular importance in the catalytic hydroforming of naphtha using expensive metals such as platinum or palladium supported on alumina maintained in a dense-phase fluidized state in order to produce products of higher isoalkane and aromatic content. Despite the fact that the catalyst is maintained in a dense-phase fluidized state in the preceding operations, a certain amount of catalyst fines is present in the gaseous product taken overhead and such fines must be separated in order to conserve catalyst and/or maintain product quality.

The use of filters, generally bayonet-type units, for the purpose of removing fluid catalyst fines from effluent gases is known to the art. Thus, filtration has been accomplished prior to my invention by the use of porous steel filters having very fine pore openings, for example, in the range from about 0.0002 inch to about 0.0065 inch. When a process utilizing such filters is operated, the filters gradually become plugged with fines. When this takes place the flow of gases therethrough has been stopped by closing a suitably located valve, and the filters have then been blown back in order to remove fines and permit the filters to function normally. A plurality of filter units has heretofore been used, some of which are kept onstream while others are being cleaned by reverse flow, in order to provide for continuous equipment operation. The use of a blowback procedure has not been entirely satisfactory for filter cleaning, however, since proper blowback is difficult to achieve, too high a rate of blowback impairing the effectiveness of the subsequent filtration operation, and also since the operating equipment must include special means for accomplishing the blowback.

In accordance with my present invention, I have discovered that filters which have become plugged with finely divided solid particles when used in the separation of such particles from gases can be cleaned by first stopping the flow of gases through the filter and then vibrating the filter in an appropriate manner. When this is done in accordance with my invention, a reaction vessel in which such a filter is positioned is not subjected to undue vibration and at the same time the vibration does not seriously affect the operating life of the filter.

For a more complete understanding of my invention, reference is made to the accompanying drawings in which:

Fig. 1 represents in diagrammatic form a reaction system falling within the scope of my invention, the system including filters and vibrating means;

Fig. 2 represents in diagrammatic form another reaction system falling within the scope of my invention;

Fig. 3 sets forth in greater detail the filters, vibrating means and associated apparatus;

Fig. 4 is a cross-section of one of the filters of Fig. 2;

Fig. 5 shows in greater detail the vibrating means and the associated apparatus; and Fig. 6 is a detailed view of the air hammer mounts.

Referring particularly to Figs. 1 and 3 there is shown an elongated, generally cylindrical reaction vessel having an upper portion 1 and a lower portion 2. The reaction vessel is also equipped with bayonet-type filters 3, heater 4 which serves to heat hydrocarbons introduced through line 5, line 6 for removing hydrocarbons from the reaction vessel, catalyst charge hopper 7 and line 8 for introducing catalyst into the reaction vessel and line 9 for removing catalyst from the reaction vessel to the catalyst storage hopper.

Filters 3 are conventional hollow porous stainless steel filters made of alloy having the nominal composition 18 percent chromium, 8 percent nickel, 0.04 percent carbon maximum and the remainder being iron. As shown in Fig. 5 the filters are generally elliptical in cross-section and are internally braced for their full length with a flattened pipe 10. The filters are supported by means of steel pipes 11 which are welded to the filters through couplings 12 and which are welded to the top of the reaction vessel as shown. Reaction gases pass through the filters, lines 11 and 6 and valve 17. Welded to pipes 11 are shaker lugs 13, shown in further detail in Fig. 6. Shaker lugs 13 are provided with hole 14 through which pin 15 is inserted to transmit vibrations from air hammer 16 to pipe 11 and hence to filter 3, the hammer vibrating horizontally. Figure 4 shows a detail of the top connections on the reaction vessel.

In testing the apparatus described in the removal of finely divided solid particles from gases, virgin Aerocat (a conventional catalyst used in the conversion of gas oil in accordance with the dense-phase fluidized bed process) is supplied to the reaction vessel by means of hopper 7 and line 8. Air is introduced through line 5 and heated in heater 4 to a temperature of 950° F., the rate of air introduction being such that the superficial velocity of the air through the reactor is about 0.5 feet per second and the rate of catalyst introduction being such that a dense-phase fluidized bed is maintained in the reaction vessel with the upper level of the bed varying in distance from the bottoms of the filters. When used, the air hammer is vibrated at a frequency of approximately 110 cycles per second. The amplitude of vibration of the hammer proper was so small as to be difficult to observe and is dependent upon the flexure of the pipe, possibly 1/64 inch, although the piston contained in the hammer moved about 1/8 inch to about 1/4 inch.

When the apparatus is operated in this manner at atmospheric pressure, filter operation can be stabilized by one minute vibrations every one or two hours. During the operation, the pressure drop across the filter gradually rises to a maximum of about twenty-five inches of water and at this point valve 17 is closed and the air hammer started. After vibrating for the one minute period, the pressure drop across the filter falls to a minimum of about twelve inches of water. In the work described, the filter was not run to destruction, and therefore no estimate of the maximum operable life was obtained. However, the work indicated that the useful operating life of the filter would be at least fifty days of continuous operation of the apparatus.

This operation can of course, be part of an overall fluidized catalyst cracking system or other similar systems where the reactant as a vapor or a liquid and catalyst are charged to the reaction vessel, gases are taken overhead and catalyst removed from the vessel through a separate line. Also, it will be appreciated that the nature and mechanism of the vibration introduced in the filter in accordance with my invention is such that the particles adhering to the filter are thrown from the filter without introducing an appreciable vibration in the reaction vessel proper. Suitable means other than an air hammer can be used to vibrate the filter in my invention.

The mechanism of the resonant vibration excited in the filter by the external vibrator is as follows: Various modes of vibration are excited in the filter. These modes may be classified as longitudinal, parallel to the axis of the filter; transverse, perpendicular to the axis of the filter; and complex combinations of the modes listed above. For an arbitrary vibration frequency there is a small vibration amplitude induced in the filter and consequently little or none of the desired effect of shaking fine particles off the filter. The maximum amplitude of vibration occurs when the externally applied vibration frequency is close to a natural frequency of the system. This is known in the theory of vibrations as a resonance effect. The system may be defined as the external pipe plus the filter. The natural frequency of the system will be affected by the connection at 18 and to a more minor extent by the gas present in the chamber. The natural frequency of such a complex system, with complex modes of vibration, is extremely difficult to solve theoretically, but it is a well-known fact in the theory of vibrations that such a natural frequency will exist.

By tuning the vibrator, empirically, to a frequency close to the natural frequency of the system, therefore, greatly enhanced vibrations are induced in the filter. The frequencies of externally applied vibration which will enhance the filter vibration amplitude form a broad band because of dissipative effects in the system due to frictional effects in the filter and surrounding gas. For an ideal simple system with no dissipative effects it is well-known that the resonance frequencies will be extremely sharp, but these ideal conditions do not exist nor are desirable in the present case since the presence of a broad band of usable vibration frequencies makes tuning much easier.

The use of such a tuning or resonance, procedure has the advantage that the closure at 18 remains unharmed since the resonance frequency and amplitude applied to the external pipe is less than will cause undue strain at this point. This feature is one of the outstanding advantages of the method described over other possible methods which might involve harm to the closure or a much more complex and expensive arrangement.

The effective band of resonance vibration frequencies applied to the external pipe will vary with choice of materials of construction and specific dimensions used in the apparatus. It should be possible, in principle, to design apparatus of this type so that the natural frequency of the system may be driven by an externally applied vibration frequency which may be experimentally obtainable and applied without harm to the apparatus.

The porous filter which I use is of a kind made by the powder metallurgy process in which a suitably powdered mass of metal is pressed into the desired shape and then heated to a sufficient temperature, below the melting point of the metal, where intermetallic diffusion and partial joining of the individual metal particles occur, resulting in a solid metal part containing a multitude of voids or pores. Such filters can be made of most of the common metallic materials and, depending upon the metal, can be used at temperatures up to about 1200° F.

In Fig. 2 I have illustrated another type of system incorporating the present invention. In this system preheated and vaporized oil is charged through line 100. The oil is mixed with hot regenerated catalyst from catalyst standpipe 101 in mixing and feed line 102. The resulting mixture of catalyst suspended in charge oil vapors is conducted as a stream through reactor tube 103 and is discharged tangentially as illustrated into separator 104. The suspension of catalyst in oil vapors is broken in separator 104 and the bulk of the catalyst particles settle by gravity to the bottom of the separator and into standpipe 105 from which they may be withdrawn to hopper 106. Spent catalyst is withdrawn from hopper 106 by line 107 and regenerated by conventional stripping and regeneration means or by a similar type riser system.

Separated oil vapors rising through separator 104 pass through filters 108, lines 110 and 113 and valve 114. Lines 110 are rigidly connected to the filters by couplings 109 and the lines are welded to the top of separator 104 and to shaker lugs 115. Air hammers 111 are connected to lugs 115 through pins 112. Thus the air hammers are used to vibrate the filters after the flow of reaction gases leaving separator 104 by way of line 114 has been stopped.

I claim:

An apparatus comprising an elongated, vertically positioned, generally cylindrical vessel; a first conduit for removing finely divided solids from the lower portion of said vessel; porous metal filter means positioned within the upper portion of said vessel in communication with the interior of said vessel, a second conduit extending to said vessel for removing gas from the interior of said vessel which has passed through the filter means, said filter means being rigidly affixed to said second conduit and said second conduit being rigidly affixed to said vessel at the point where the conduit extends through said vessel; valve means positioned in said second conduit externally of said vessel; and means for subjecting said second conduit to periodic resonant vibration positioned at a point intermediate said valve means and said vessel.

References Cited in the file of this patent

UNITED STATES PATENTS

| | | |
|---|---|---|
| 1,538,292 | Lindsay | May 19, 1925 |
| 2,220,641 | Davis | Nov. 5, 1940 |
| 2,477,623 | Kling | Aug. 2, 1949 |
| 2,526,651 | Garbo | Oct. 24, 1950 |